United States Patent [19]

Rodriguez

[11] 3,860,255
[45] Jan. 14, 1975

[54] LIFT TRAILER

[76] Inventor: Rafael Rodriguez, 6765 S.W. 19 Ter., Miami, Fla. 33155

[22] Filed: Dec. 3, 1973

[21] Appl. No.: 420,772

[52] U.S. Cl. .......................... 280/43.19, 280/414 A
[51] Int. Cl. ........................................... B62d 21/14
[58] Field of Search........... 280/43.18, 43.19, 43.23, 280/414 A

[56] References Cited
UNITED STATES PATENTS

| | | | |
|---|---|---|---|
| 2,478,795 | 8/1949 | Whalen et al..................... | 280/43.18 |
| 2,577,246 | 12/1951 | Hill.............................. | 280/43.19 X |
| 2,711,259 | 6/1955 | Jones........................... | 280/414 R X |
| 2,905,481 | 9/1959 | Schramm........................ | 280/43.18 |
| 3,342,505 | 9/1967 | Diehl............................. | 280/43.18 |

*Primary Examiner*—David Schonberg
*Assistant Examiner*—Michael J. Forman

[57] ABSTRACT

A lift trailer, including hitch means for attachment to a tow vehicle, comprising generally a main frame including a tongue portion providing winch means, a pair of stub shafts projecting outwardly from the opposed side rails of the main frame to carry a pair of wheels, a transverse bar, connecting between the side rails rearwardly of the wheels, a load-carrying bed, fixed to the rear end of a secondary frame, journaled to the transverse bar, said secondary frame including a forwardly extending tongue portion providing latch means for detachable connection to the tongue of the main frame. The trailer structure is balanced in a manner whereby the load-carrying bed and secondary frame drop to the ground and lie flat thereon when the tongues are unlatched. At the same time, the main frame pivots about the axis of the wheels and assumes a forwardly, upwardly extending attitude. The winch means is actuated to bring the two frame structures back into alignment.

7 Claims, 3 Drawing Figures

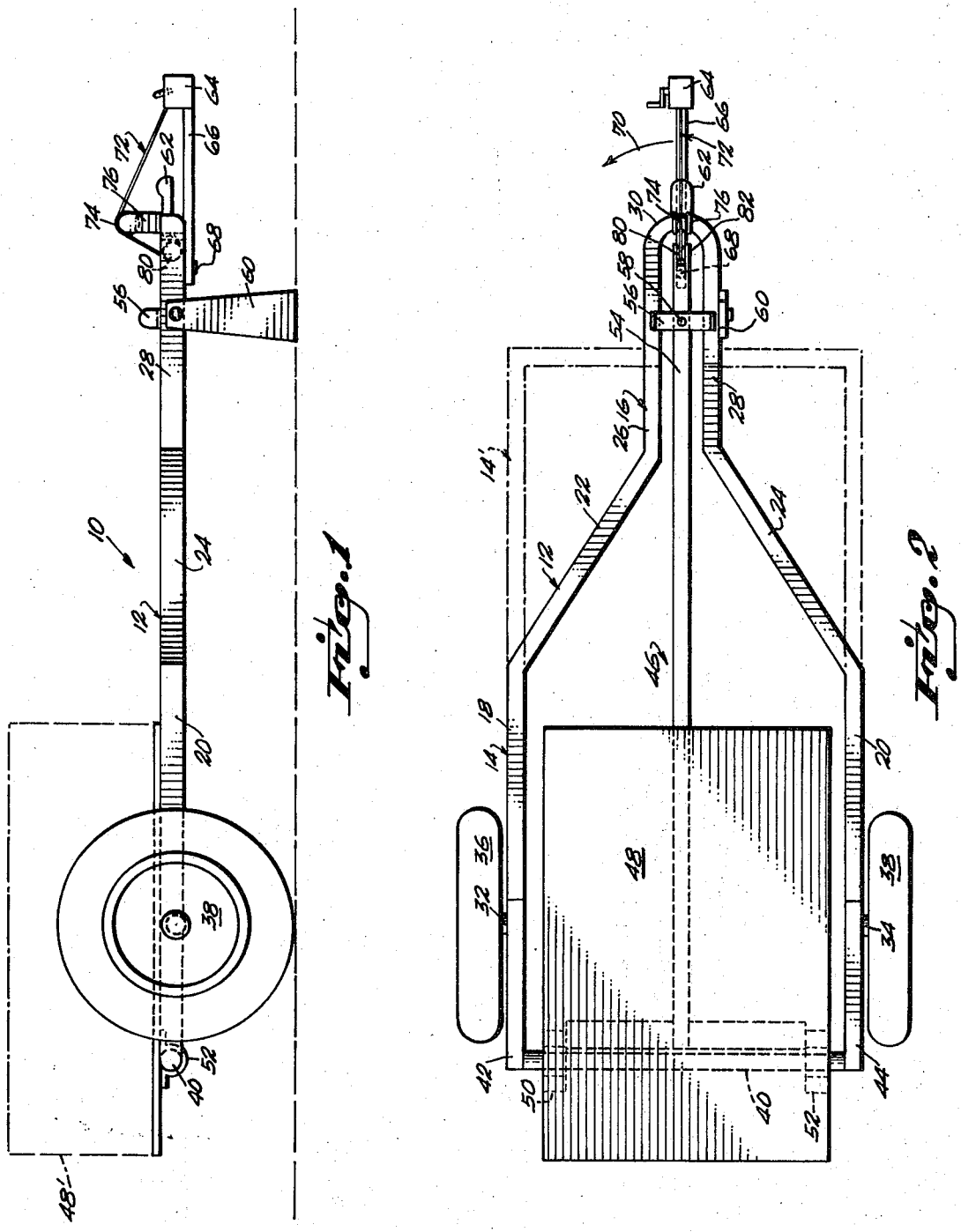

LIFT TRAILER

FIELD OF THE INVENTION

The present invention pertains to utility trailers and is more particularly directed to a trailer which includes hitch means for attachment to a tow vehicle and which provides a load-carrying bed, adaptable to being dropped to ground level for loading and unloading purposes.

OBJECTS AND ADVANTAGES OF THE PRESENT INVENTION

One of the principal objects of the present invention is to provide a trailer of the type which is detachably connectible to a tow vehicle and which includes a load-carrying bed portion which may be dropped substantially to ground level for loading and unloading purposes.

Another principal object of this invention is to provide a trailer of this type which is adaptable to carrying various types of loads such as farm produce, automotive vehicles, boats, etc., which are most readily adapted for loading at ground or water level.

Yet another object of the present invention is to provide a trailer which may be loaded at ground or water level and which includes means for elevating the load-carrying bed with the load thereon to a normal condition for transporting the load over the road.

A still further object of the instant invention is to provide such a trailer which requires very little manual effort to effect the required manipulations to condition the trailer for the loading and unloading operations and which is relatively simple and inexpensive to produce.

BRIEF DESCRIPTION OF THE DRAWINGS

FIG. 1 is a side elevational view of the lift trailer of the present invention;

FIG. 2 is a top plan view of the trailer of FIG. 1; and

DETAILED DESCRIPTION OF THE DRAWINGS

Figure 3:
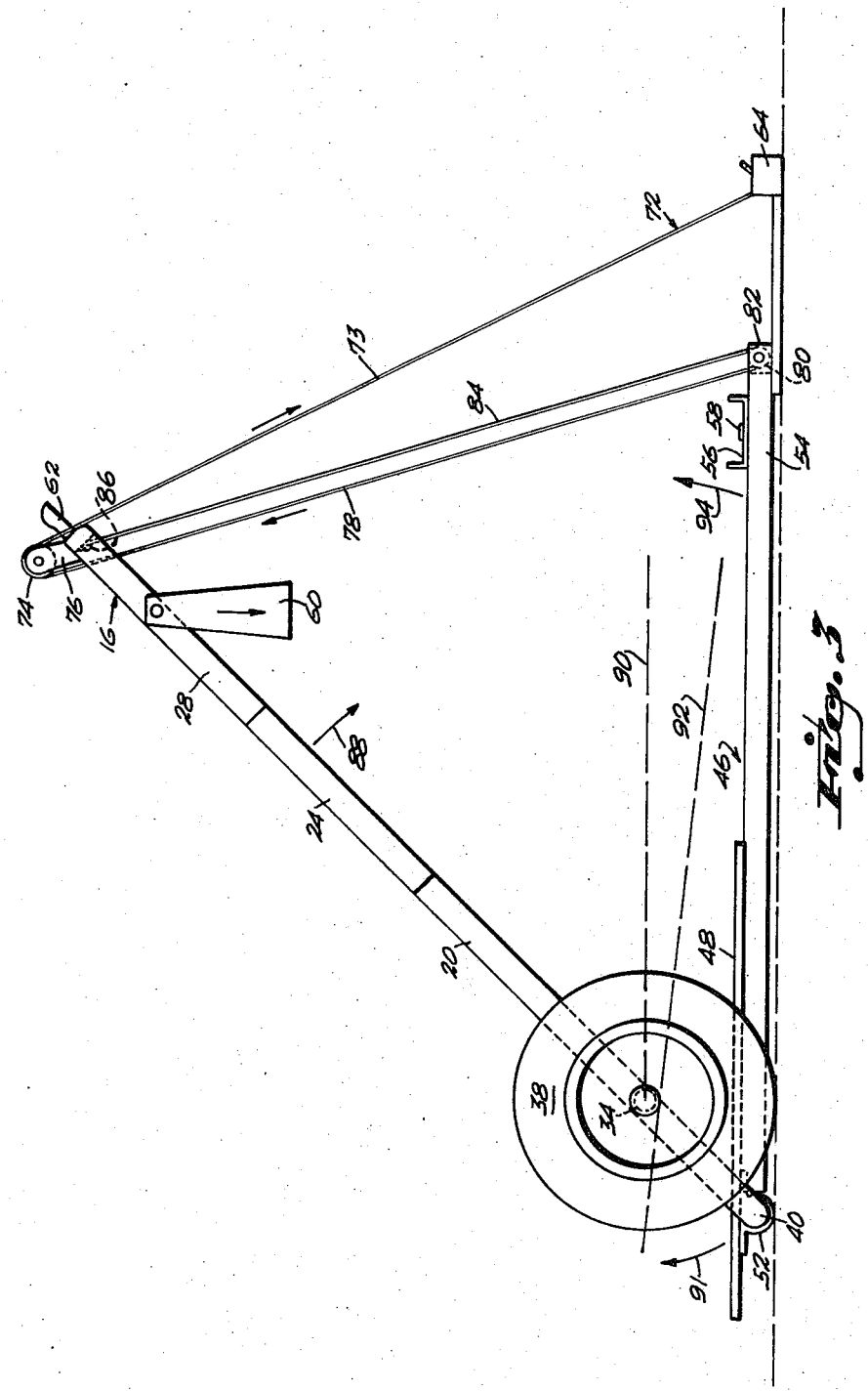
FIG. 3 is a side elevational view similar to FIG. 1, illustrating the operation of the trailer.

With reference to the drawings in which like reference numerals designate like or corresponding parts throughout the various views and with particular reference to FIGS. 1 and 2, the lift trailer of the present invention is designated generally at 10. The trailer 10 includes a main frame 12 comprised of an enlarged rear portion 14 and a forwardly extending tongue portion 16.

The enlarged rear portion 14 includes a pair of spaced apart parallel side rails 18 and 20, a pair of forwardly converging rails 22 and 24 connecting between the respective rails 22 and 24 and a pair of relatively closely spaced, parallel rails 26 and 28 defining the tongue 16. A rounded nose 30 connects the forward ends of the rails 26 and 28 as seen in FIG. 2.

A pair of axially aligned wheel spindles 32 and 34 are fixed to and extend outwardly from the respective side rails 18 and 20 to mount the wheels 36 and 38. With further reference to FIG. 2, a transverse bar 40 is rigidly fixed between the rear ends 42 and 44 of the side rails 18 and 20, substantially rearwardly of the wheel spindles 32 and 34.

A secondary frame, generally indicated at 46, carries a load-carrying bed 48, fixed thereto, rotatably mounted to the transverse bar 40 by a pair of journals 50 and 52. The secondary frame 46 includes a forwardly extending tongue portion 54 which normally bisects the space between the rails 26 and 28 and stops short of the rounded nose 30 as best seen in FIG. 2.

A suitable latch means such as the latch bar 56, pivotally connected intermediate its length at 58 to the top surface of the tongue 54, serves to normally maintain the secondary frame 46 in coplanar relation with the main frame 12 when it is disposed in the transverse position, illustrated in FIG. 2.

As best illustrated in FIG. 1, a support leg 60 is pivotally mounted at its upper end to one tongue rail such as 28. When the trailer 10 is not mounted to a tow vehicle, the leg 60 serves to support the front portion of said trailer. In practice, the support leg 60 would preferably be in the form of a conventional jack, used to position a trailer hitch such as 62 relative to a ball coupling fixed to the rear end of a tow vehicle.

The portion of the main frame 12 behind the wheel spindles 32 and 34 is preferably constructed of a considerably heavier material than the front end thereof or, alternatively, a counterweight means may be fixed to the rear end of the main frame or the load bed behind the axis of the wheel spindles so that the rear end of the trailer, behind the axis of the wheels, is heavier than the front end, forwardly of the wheel axis. Consequently, when the latch 56 is rotated out of engagement with the tongue rails 26 and 28, the secondary frame 46 and load-carrying bed 48 drops to the ground (FIG. 3), and pivots the main frame 12 about the axis of the wheels 36 and 38 to the forwardly, upwardly inclined attitude as illustrated because of the journaled connection at 50 and 52 to the bed 48.

In effect, the trailer functions as a lever with the axis of the wheels forming the fulcrum, the shorter but heavier rear portion of the lever serving to pivot the main frame 12 as illustrated and described.

A winch 64 is fixed to the forward end of an arm 66, pivoted at 68 to the secondary frame tongue 54. The arm 66 is swingable from a first positon, as illustrated, to position the winch 64 for use in retracting the main frame 12 and secondary tongue 54, to a second position wherein said winch 64 is swung out of the way as indicated by the arrow 70.

From the winch 64, a cable 72 extends upwardly at 73 and over a pulley 74, mounted as at 76 to the forward tip end of the main frame tongue 16, then downwardly at 78 and around a second pulley 80, mounted in the bifurcated front end 82 of the secondary frame tongue 54, and then upwardly at 84 to a point of attachment 86 to the main frame tongue 16.

When the winch 64, which may be of a manually or electrically operated type, is actuated, the cable run 73 is withdrawn onto the winch 64, causing the main frame to swing downwardly, indicated by the arrow 88. When the main frame 12 is retracted into a horizontal plane, indicated by the broken line 90, the leg 60 will have moved into contact with the ground arresting the movement of said main frame 12.

At this point, the lever action of the main frame 12 will have pivoted the rear end of the secondary frame and load-carrying bed 48 upwardly about the wheel axis fulcrum as indicated by arrow 91. However, the secondary frame tongue 54 will be angled forwardly and downwardly, indicated by the broken line 92.

Continued manipulation of the winch 64, after the leg 60 is set against the ground, causes the secondary frame tongue 54 to pivot into a coplanar relation with the main frame 12, indicated by arrow 94. The trailer is then conditioned for attachment to a tow vehicle in a conventional manner after the winch is swung rearwardly as previously described and the tongues are latched by the latch means 56.

The trailer as illustrated and described is intended to present the basic principals thereof. Obviously, the main fame may be configurated differently, one form being shown by the dot-dash lines 14' in FIG. 2. Also, the boad-carrying bed 48 may include walls 48', FIG. 1.

Various structural designs may be provided to adapt the trailer for specific or general use. For example, it can be used to transport harvested crops, for carrying machinery, various types of vehicles, general merchandise and, with the addition of appropriate support means on the bed, it could be used as a boat trailer, in fact, it would be practical for hauling any type of item which could be more easily loaded onto or removed therefrom because of the unique "on the ground" loading and unloading disposition of the load-carrying bed.

Heavy loads presents no lifting problem and are, in fact, raised very easily on the load-carrying bed because, in addition to the built-in work advantage provided by the conventional gear ratio of the winch, a very substantial additional work advantage is derived from the lever action, previously described relative to the wheel axis fulcrum; in the trailer illustrated it would be approximately a 5 to 1 advantage.

What is claimed is:

1. A lift trailer for selective coupled engagement with a tow vehicle comprising,
   A. a main frame including,
      1. an enlarged rear portion providing, a pair of spaced apart rear side rails,
      2. a forwardly extending tongue portion connecting to said rear side rails,
      3. a pair of axially aligned wheel spindles, fixed to and extending outwardly from the respective rear side rails to mount a pair of wheels,
      4. a transverse bar, fixed between the rear ends of said rear side rails, substantially rearwardly of said wheel spindles;
   B. a secondary frame including a forwardly extending tongue portion;
   C. load-carrying means fixed to said secondary frame;
   D. means to rotatably journal said load-carrying means and secondary frame to said transverse bar;
   E. latch means for selectively latching said main frame and secondary frame to said transverse bar;
   F. latch means for selectively latching said main frame and secondary frame tongues to maintain said frames in a generally coplanar, horizontal disposition above the ground level or unlatching said tongues relative to each other to permit said secondary frame and load-carrying means to drop to ground level and to simultaneously tilt said main frame forwardly and upwardly;
   G. leg means pivotally connected to said main frame tongue to maintain the trailer in a generally horizontal attitude when said tongues are latched;
   H. winch means connected to said secondary frame tongue;
   I. pulley means on said main and secondary frame tongues;
   J. cable means from said winch, extending around said pulley means to realign said frames upon actuation of said winch, with said latch means in an unlatched condition;
   K. said pulley means comprising a first pulley mounted atop the forward end of said main frame tongue and a second pulley mounted relative to the forward end of said secondary frame tongue;
   L. said cable means comprising a cable extending outwardly from said winch, upwardly and over said first pulley, downwardly and around said second pulley and upwardly to a point of attachment to the forward end of said main frame tongue.

2. The lift trailer as defined in claim 1 wherein the portion of said main frame behind the axis of said wheel spindles is heavier in weight than the portion forwardly of said axis.

3. The lift trailer as defined in claim 1 wherein said leg means comprises a manually operated jack.

4. The lift trailer as defined in claim 1 including an arm pivotally connected at a first end to the forward end portion of said secondary frame tongue and having said winch means fixed to a second end thereof.

5. The lift trailer as defined in claim 1 wherein said forwardly extending tongue portion of said main frame is comprised of a pair of relatively closely spaced apart, parallel rails connecting respectively to said rear side rails and including a nose rail connecting between the forward ends of said pair.

6. The lift trailer as defined in claim 5 wherein said secondary, forwardly extending tongue portion generally bisects the space between said pair of rails comprising said main frame tongue portion and stops short of said nose rail.

7. The lift trailer as defined in claim 6 wherein said latch means comprises a latch bar, pivotally connected intermediate its length to the top of said secondary frame tongue whereby it may selectively rotate into or out of engagement with the tops of said pair of rails comprising said main frame tongue.

* * * * *